(12) United States Patent
Snowdon et al.

(10) Patent No.: US 6,576,591 B1
(45) Date of Patent: Jun. 10, 2003

(54) OPTICAL FIBER COATING AND CODING SCHEME

(75) Inventors: Kenneth Snowdon, Chelmsford (GB);
James D Watts, Chelmsford (GB);
Christopher G Tanner, Sturmer (GB);
Andrew Waterhouse, Paignton (GB);
Alan Fisher, Torquay (GB)

(73) Assignee: Nortel Networks Limited, St. Laurent (CA)

( * ) Notice: Subject to any disclaimer, the term of this patent is extended or adjusted under 35 U.S.C. 154(b) by 23 days.

(21) Appl. No.: 09/697,459

(22) Filed: Oct. 26, 2000

(51) Int. Cl.[7] ............ B41M 5/20; D06P 3/52; D06P 5/24
(52) U.S. Cl. ............ 503/227; 8/471; 8/472; 8/523; 8/509; 8/510
(58) Field of Search ............ 8/467, 468, 469, 8/470, 471, 472, 523, 509, 510; 427/146, 148, 149, 147, 152, 163.2, 457, 458, 466, 468; 503/227

(56) References Cited

U.S. PATENT DOCUMENTS

| | | | |
|---|---|---|---|
| 4,503,437 A | * 3/1985 | Katzschner | 346/1.1 |
| 4,543,103 A | * 9/1985 | Troesch | 8/523 |
| 4,629,285 A | * 12/1986 | Carter et al. | 350/96.23 |
| 4,664,672 A | * 5/1987 | Krajec et al. | 8/472 |
| 5,645,899 A | * 7/1997 | Unterberger | 427/558 |
| 6,086,775 A | * 7/2000 | Pritchett, Jr. et al. | 216/24 |
| 6,381,390 B1 | * 4/2002 | Hutton et al. | 385/114 |
| 2001/0048797 A1 | * 12/2001 | Van Dijk et al. | 385/114 |
| 2002/0006262 A1 | * 1/2002 | Galaj et al. | 385/137 |

* cited by examiner

*Primary Examiner*—J. M. Gray
(74) *Attorney, Agent, or Firm*—Barnes & Thornburg

(57) ABSTRACT

A coding scheme to identify the connections an optical fiber is to form in an optical assembly is provided. The coding scheme consists of a series of colors, typically four, provided along the fiber length. The combination of colors identifies the connection the fiber is to form. Colors are transferred to the optical fiber by sublimation of the dye at a relatively low temperature. The sublimed dye then diffuses into the outer coating of the optical fiber.

13 Claims, 3 Drawing Sheets

OPTICAL FIBER COATING AND CODING SCHEME

BACKGROUND TO THE INVENTION

This invention relates to an optical fiber coating and to a fiber coding scheme. The invention further relates to a method of coloring an optical fiber coating and to apparatus for coloring an optical fiber coating.

Optical fibers used to connect components in optical assemblies can be as long as 0.8 to 1 meter. Referring now to FIG. 1 of the accompanying drawings, a cross-section of an optical fiber is illustrated. In FIG. 1, the optical fiber 2 consists of an inner core 4 surrounded by a cladding layer 6. The inner core 4 is typically 5 microns in diameter for mono-mode fibers and the cladding layer 6 surrounding the core 4 is typically 60 microns thick. The cladding layer 6 is then coated with first and second acrylic protective coatings 8a, 8b. The first acrylic coating 8a is applied directly to the glass cladding 6. The first acrylic coating 8a is typically 25 to 45 microns thick and is relatively soft so as to not damage the cladding. The second acrylic coating 8b is harder than the first coating has a thickness selected to increase the overall diameter of the optical fiber 2 to around 250 microns.

The core, cladding, and acrylic coatings are typically colorless or transparent which presents considerable difficulty when identifying fiber connections in an optical assembly. Typically, present optical assemblies require 64 or more fiber connections to be identified. Future optical assemblies having more complex optical component arrangements will require even larger numbers of fiber connections.

The number of fibers, and their length increases the complexity and level of difficulty involved with identifying which fiber in a bundle of fibers is to be connected. Forming a series of fiber connections in the correct sequence is a time-consuming task which is prone to human error due to the visual similarity in the fibers.

One known solution to the problems associated with identifying fiber connections is to provide fibers having coloured acrylic coatings. This solution is unsatisfactory as the coloring agents are known to affect the curing process of at least the outer acrylic coating. The limited number of coating colours which can be easily visually distinguished does not greatly improve visual recognition due to the necessity of duplicating fiber colors in an optical assembly having a large number of components. Moreover, the limited number of colors prevents color coatings being established as an identification means in any automated production process. Furthermore, maintaining stocks and the supply of fibers with appropriate color coatings presents inventory problems.

SUMMARY OF THE INVENTION

The present invention seeks to obviate or mitigate the above problems by providing a fiber coding scheme which enables an individual fiber to be identified and distinguished from other fibers. The scheme comprises a series of color coded bands which are applied to the ends of optical fibers using a printing process. The color coded banding scheme enables a fiber connection to be uniquely identified.

One object of the invention relates to a fiber coating which identifies the connection to be made by an optical fiber within an optical subassembly.

Another object of the invention relates to an optical fiber coding scheme which codes the optical fiber according to a designated connection the fiber is to form within an optical subassembly.

A first aspect of the invention provides an optical fiber coating including a color sequence, the color sequence comprising a plurality of colored portions along the length of the fiber.

Preferably, the colored portions are dyed. More preferably, the colored portions are dyed by a thermal transfer process.

The color sequence may be selected to identify the fiber uniquely and/or to uniquely identify the connections the fiber is to form.

A second aspect of the invention provides an optical fiber coding scheme comprising the steps of:

selecting a color sequence to identify an optical fiber; and forming the color sequence along and optical fiber.

Preferably, the color sequence is selected to uniquely identify the connections the optical fiber is to form.

A third aspect of the invention seeks to provide a method of coating an optical fiber with a colored dye, the method comprising the steps of:

positioning a length of the fiber upon a sheet of material coated with a sequence of colored dyes;

heating the fiber using thermal transfer apparatus to transfer such that the colored dye is transferred from the material to the fiber;

cooling the fiber; and removing the fiber from the thermal transfer apparatus.

Preferably, in the step of positioning a length of fiber, an end portion of the fiber is coated with dye.

A fifth aspect of the invention provides a sheet of material coated with dye for use in a method of dying an optical fiber coating, the dye forming a sequence of differing colors arranged across the sheet.

A sixth aspect of the invention provides a thermal transfer apparatus for use in a method of coating an optical fiber with a sequence of colored dyes, the apparatus including a pair of plates, the plates capable of being pressed together in use. At least one plate may have at least one groove capable of retaining an optical fiber.

A seventh aspect of the invention provides a carrier medium for a dye to be transferred to an optical fiber using thermal transfer apparatus, the carrier medium comprising;

a sheet of material; and at least one dyed surface area on the sheet of material.

An eighth aspect of the invention provides a carrier medium for a dye to be transferred to an optical fiber, the carrier medium comprising:

a container capable of dispensing a dye solvent onto the optical fiber.

Advantageously, the fiber coating process enables the surface coating of an optical fiber to be colored using a thermal printing process. The printing process mitigates the potential for damage to the optical fiber.

Advantageously, the printing process enables a dye to diffuse into the outer coating of the optical fiber. This ensures that the dye is fixed and provides a means of generating a strong color on the transparent fiber.

Advantageously, by coding the colors of the fiber coating according to the connection the fiber is to make in an optical assembly, achieving the correct sequence of connections is facilitated.

BRIEF DESCRIPTION OF THE DRAWINGS

There follows a description of the invention with reference to the accompanying drawings which are by way of example only and in which.

DETAILED DESCRIPTION OF PREFERRED EMBODIMENTS

Figure 1:
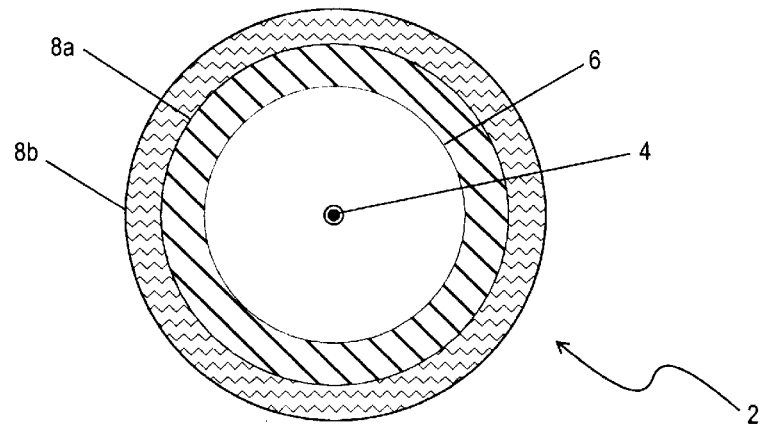
FIG. 1 sketches a cross-section through an optical fiber.

Referring now to FIG. 1 of the accompanying drawings, a cross-section of an optical fiber is illustrated. In FIG. 1, the optical fiber 2 consists of an inner core 4 surrounded by a cladding layer 6. The inner core 4 is typically 5 microns in diameter for mono-mode fibers and the cladding layer 6 surrounding the core 4 is typically 60 microns thick. The cladding layer 6 is then coated with first and second acrylic protective coatings 8a, 8b. The first acrylic coating 8a is applied directly to the glass cladding 6. The first acrylic coating 8a is typically 25 to 45 microns thick and is relatively soft so as to not damage the cladding. The second acrylic coating 8b is harder than the first coating has a thickness selected to increase the overall diameter of the optical fiber 2 to around 250 microns. The core, cladding, and acrylic coatings are typically colorless or transparent which presents considerable difficulty when identifying fiber connections in an optical assembly.

Figure 2:
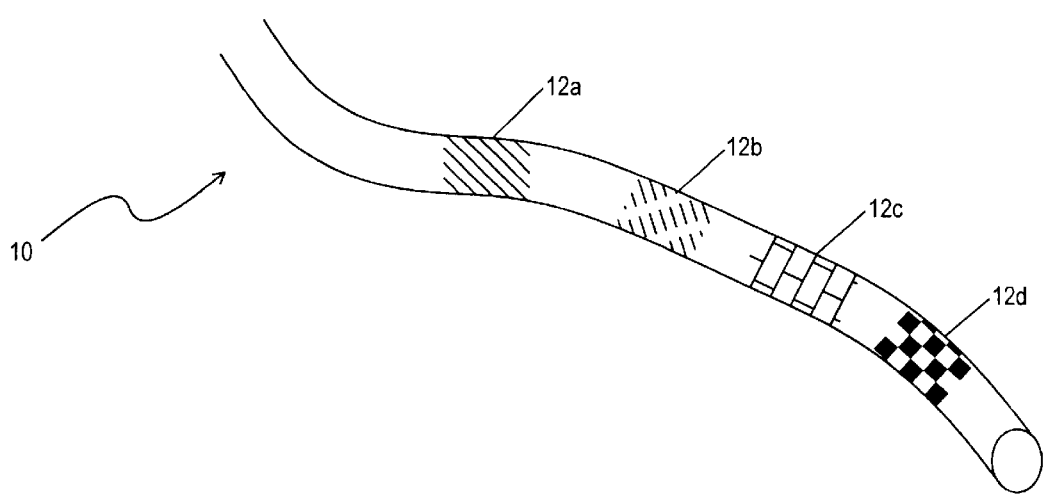
FIG. 2 sketches an optical fiber end having a coded coating according to one embodiment of the invention.

Referring now to FIG. 2 of the drawings, an optical fiber 10 is illustrated having at one end a series of differently colored coatings 12a, 12b, 12c, 12d formed on transparent or colorless coating.

The colored coatings are formed using sublimation transfer process. In this process, dyes are provided on a carrier medium such as a sheet of paper (see FIG. 3). In the transfer process, the optical fibers are placed in contact with the dyed surface of the paper and are heated until dyes sublime. The sublimed dyes are able to diffuse into the polymeric coating (see coating 8b in FIG. 1) on the fiber. This results in a long lasting, strong colored coating along the dyed portion of the fiber.

The provision of dyes using a carrier medium such as thermal transfer paper enables the dyes to be transferred using simple thermal printing apparatus. Such printing apparatus is relatively simple and can be provided in the form of a small heat press. The apparatus can be provided on a small, portable, scale. Generally such printing apparatus and the sublimation dyes are relatively cheap.

Figure 3:
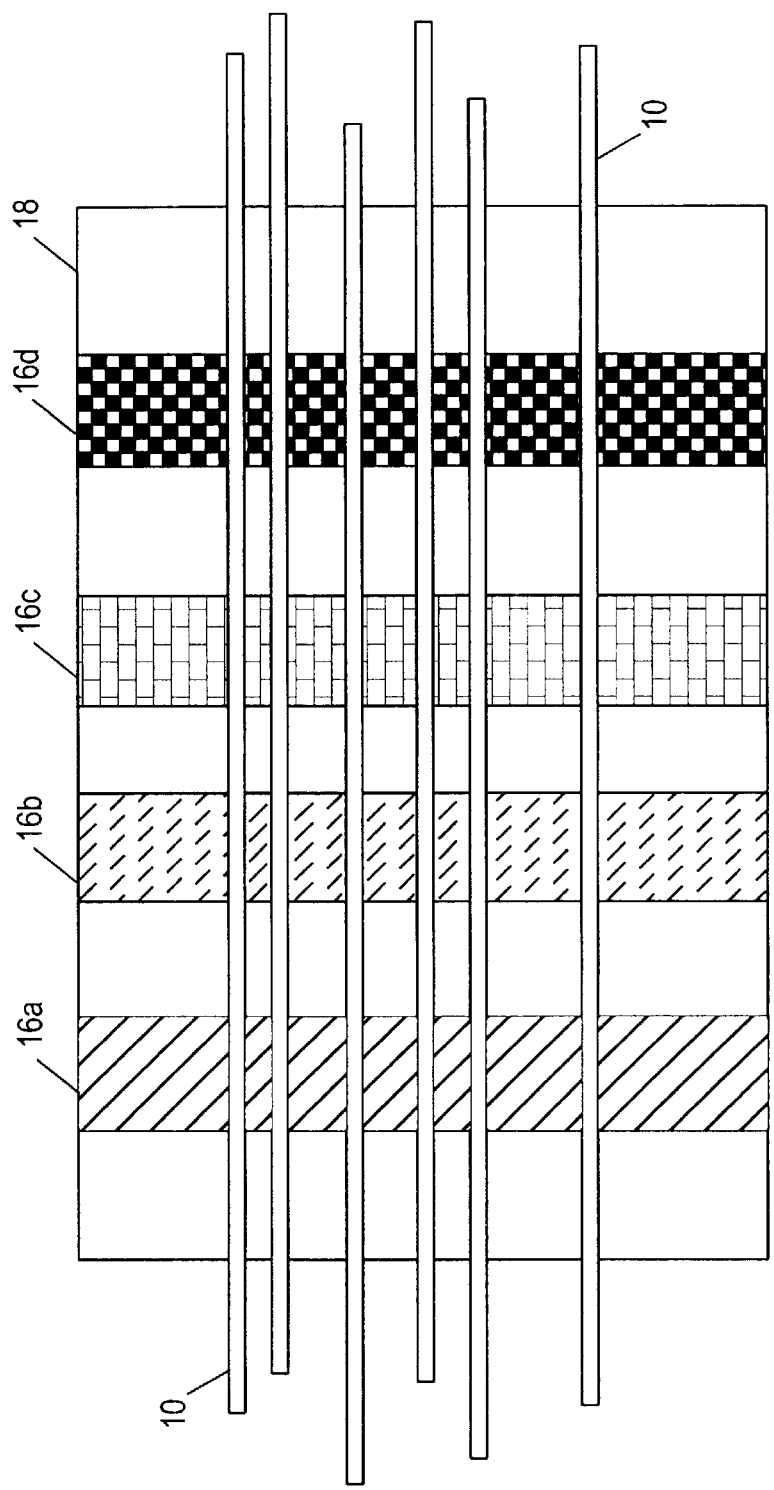
FIG. 3 sketches a thermal transfer paper having inked portions together with optical fibers positioned thereon.
Figure 4A:
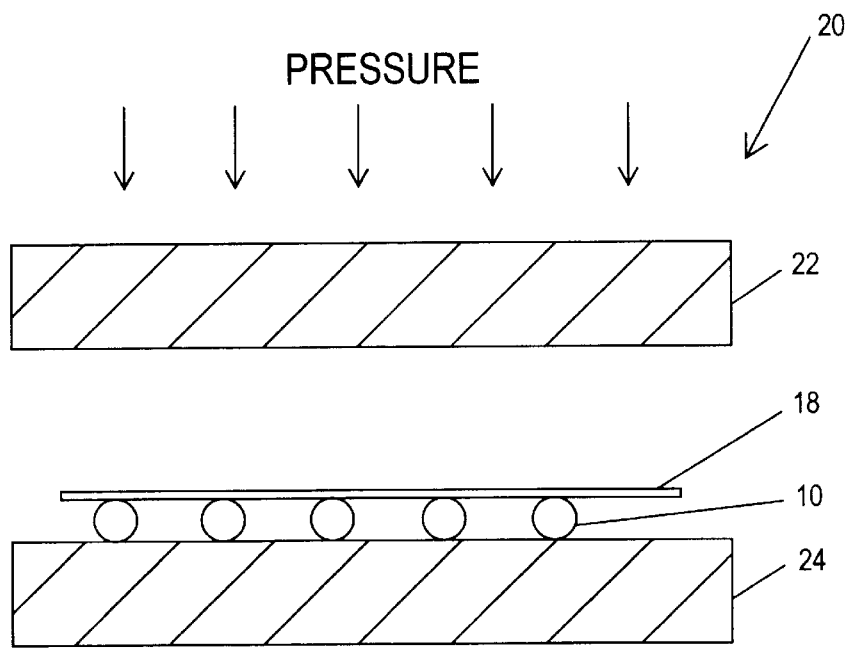
FIGS. 4A and B sketch a thermal transfer printing apparatus according to one embodiment of the invention.
Figure 4B:
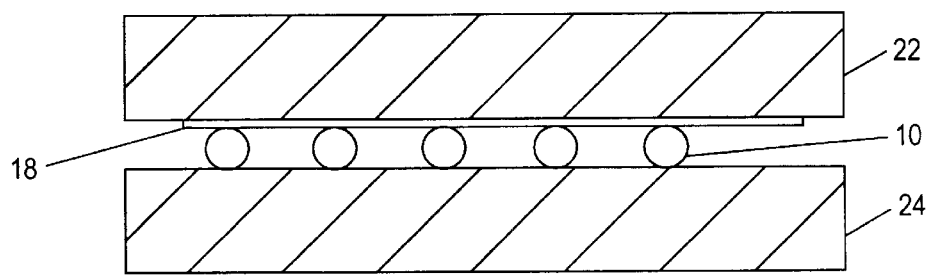

To transfer the dyes from the thermal transfer paper to the fiber coating, at least an end portion of an optical fiber 10 is placed in contact with inked portions 16a, 16b, 16c, 16d of thermal transfer paper 18, see FIGS. 3, 4A and 4B. The transfer paper can be used to dye several fibers at once, as is shown in FIG. 3.

The transfer paper and optical fiber(s) are then placed within a heat press 20 (see FIGS. 4A and 4B). Heat press 20 consists of a top plate 22 and a base plate 24. In the specific embodiment illustrated in FIGS. 4A and 4B, fibers 10 are placed under the transfer paper 18 on top of the base plate 24. Pressure is provided in a downwards direction against the top plate 22 to press the transfer paper 18 against the optical fibers 10. The temperature of the top plate 22 is approximately 200° C., and pressure is applied at about 10 p.s.i. for approximately 5 to 20 seconds. The heat sublimes the dye from the paper. The sublimed dye diffuses into the outer coating see coating 8b in FIG. 1 of the optical fibers 10. The dyes sublime within the temperature range of 180° C. to 230° C. to ensure that the fiber coating (see coating 8b in FIG. 1) is not damaged by exposure to higher temperatures.

The thermal transfer paper 18 is prepared by adding the dyes to a solvent, for example, water, to form a water-based ink. The ink can then be coated on to paper, for example by screen printing. The ink is then dried by allowing the solvent to evaporate either naturally or by heating.

Although in the above embodiment the dyes are transferred to the fibers by placing fibers under the carrier paper with the ink facing downwards in an appropriate heat press, in alternative embodiments, the carrier paper can be placed with the ink facing upwards towards fibers.

Typical ink compositions suitable for the thermal transfer process are given in the table below;

Table 1 showing dye color, CAS number, chemical name and formula of inks suitable for the thermal printing process.

| INK COLOR | CODE | CHEMICAL NAME | FORMULA |
|---|---|---|---|
| YELLOW 82 | CAS 27425-55-4 | 3-(2'-Benzimidazolyl)-7-N,N-diethyl-aminocoumarin | $C_{20}H_{19}N_3O_2$ |
| YELLOW 3 | CAS 2832-40-8 | N-[4-[(2-hydroxy-5-methylphenyl)azo]phenyl] | $C_{15}H_{15}N_3O_2$ |
| RED 1 | CAS 2872-52-8 | 2-[ethyl[4-[(4-nitrophenyl)azo]phenyl]amino]ethanol | $C_{18}H_{18}N_4O_3$ |
| RED 60 | CAS 17418-58-5 | 1-amino-4-hydroxy-2-phenoxy-9,10-Anthracenedione | $C_{20}H_{13}NO_4$ |
| BLUE 72 | CAS 81-48-1 | 1-Hydroxy-4-(para-toluidino)-9,10-anthraquinone | $C_{21}H_{15}NO_3$ |
| BLUE 359 | CAS 62570-50-7 | 1-amino-4-(ethylamino)-9,10-dihydro-9,10-dioxoanthracene-2-carbonitrile | $C_{17}H_{13}N_3O_2$ |
| BLUE 14 | CAS 2475-44-7 | 1,4-Bis(methylamino)anthraquinone | $C_{16}H_{14}N_2O_2$ |
| BLACK} | CAS 2475-44-7 | 1,4-Bis(methylamino)anthraquinone | $C_{16}H_{14}N_2O_2$ |
| BLACK} | CAS 3025-42-1 | 4-[(2-chloro-4-nitrophenyl)azo]N,N-diethyl benzamine | $C_{16}H_{17}ClN_4O_2$ |

The series of inked portions 16a, 16b, 16c, 16d along the optical fiber number four in the embodiment of the invention illustrated in FIGS. 2 and 3. This enables up to 256 color combinations to be indicated along the optical fiber. In practice however, only around 30 to 40 different color codes are likely to be required in a typical optical assembly.

In simple optical assemblies, a smaller number of different colors can be provided, e.g., 3. However, in more complicated optical assemblies where a very large number of optical fiber connections need to be formed, five or more colors can be used to increase the number of color codes for the fiber connections. A large number of color combinations is anticipated to be particularly suitable in automated construction of an optical assembly.

It will be appreciated that numerous modifications and variations on the embodiments described above will be obvious to the person skilled in the art. The scope of the invention is therefore not to be determined only from the above description but is to be determined from the accompanying claims when construed in conjunction with the above description and accompanying drawings.

The dyes indicated may have other compositions which sublime at temperatures below the temperature at which the outer coating of the optical fiber could become damaged. Moreover, if other coatings (non-acrylic) are used, other dyes may be used which diffuse easily into such coatings. Fluorescent dyes and other dyes which make the fibers more easily visible under different lighting conditions may be used. For example, the used of a yellow fluorescent dye will enable a fiber to glow brightly under the illumination of a blue/ultraviolet (UV) light.

The printing apparatus may comprise a portable device, making it suitable for workbench use by an individual. For example, an electrically operated platen. Alternatively, the ink carrying the dye may be provided in a suitable container for applying to individual fibers. The fibers can then be heated to enable the dye to diffuse into the fiber coating material. The heating apparatus could comprise a hot air blower (e.g. a hair dryer) in such a case. In particular, it is possible to use the thermal transfer printing process to quickly and easily coat the end of a fiber with just one easily identifiable color on an ad hoc basis quickly and easily.

The printing apparatus could form part of a production line for color coding optical fibers on mass. By color coding optical fibers systematically, the automated construction of optical components could be facilitated.

A further modification is that either of the plates in the heat press of FIG. 4 may be provided with at least one groove capable of retaining an optical fiber.

Alternatively, the thickness and spacing of the colored printing may be varied in the manner of a bar code.

Alternatively, dyes which evaporate rather than sublime, or which are transferred by contact may be used in other modifications of the invention.

What is claimed is:

1. A method of coloring an optical fiber with a colored dye sequence, the method comprising the steps of:
   positioning a length of the fiber upon a sheet of material coated with a sequence of colored dyes;
   heating the fiber using thermal transfer apparatus to transfer the sequence of colored dyes such that the sequence of colored dyes is transferred from the material to the fiber;
   cooling the fiber; and
   removing the fiber from the thermal transfer apparatus.

2. A method as claimed in claim 1, wherein in the step of positioning the length of fiber, the length of fibre is positioned so that a length at one end of the fiber is coated with the colored dye sequence.

3. A method as claimed in claim 1, wherein the colored dye sequence is selected to uniquely identify the fiber.

4. A method as claimed in claim 1, wherein the colored dye sequence uniquely identifies a connection the fiber is to form.

5. A method of coloring an optical fiber with a colored dye sequence, the method comprising the steps of:
   positioning a length of the fiber within a dye transfer apparatus;
   arranging a sheet of material coated with a sequence of colored dyes such that the coated surface of said sheet of material is capable of facing said length of fibre;
   using said dye transfer apparatus to enable the dye to diffuse into the outer coating of the optical fibre to transfer the sequence of colored dyes from the sheet of material to the fiber;
   cooling the fiber; and
   removing the fiber from the dye transfer apparatus.

6. A method as claimed in claim 1, wherein a plurality of optical fibres are coloured simultaneously by said dye transfer apparatus.

7. A method as claimed in claim 1, wherein said optical fibre are colour coded by said sequence of colored dyes.

8. A method as claimed in claim 1, wherein said sequence of coloured dyes varies in thickness and spacing along the longitudinal length of the optical fibre.

9. A method as claimed in claim 1, wherein said sequence of coloured dyes forms a colour coding scheme which uniquely identifies a connection said optical fibre is to form.

10. A method as claimed in claim 1, wherein the dye diffuses into the outer coating of the optical fibre by a transfer process taken from the group consisting of:
    evaporation; sublimation; and contact.

11. A method as claimed in claim 1, wherein said dye transfer apparatus comprises thermal transfer apparatus.

12. A method as claimed in claim 1, wherein said dye transfer apparatus comprises thermal transfer apparatus having:
    a top plate and a bottom plate,
    the top and bottom plates capable of being pressed together in use to sublime dye from the sheet of material to the surface of the optical fiber.

13. A method as claimed in claim 12, wherein at least one of said top plate or said bottom plate is provided with a groove capable of retaining an optical fiber in a stable position during use of said thermal transfer apparatus.

* * * * *